United States Patent Office 3,781,413
Patented Dec. 25, 1973

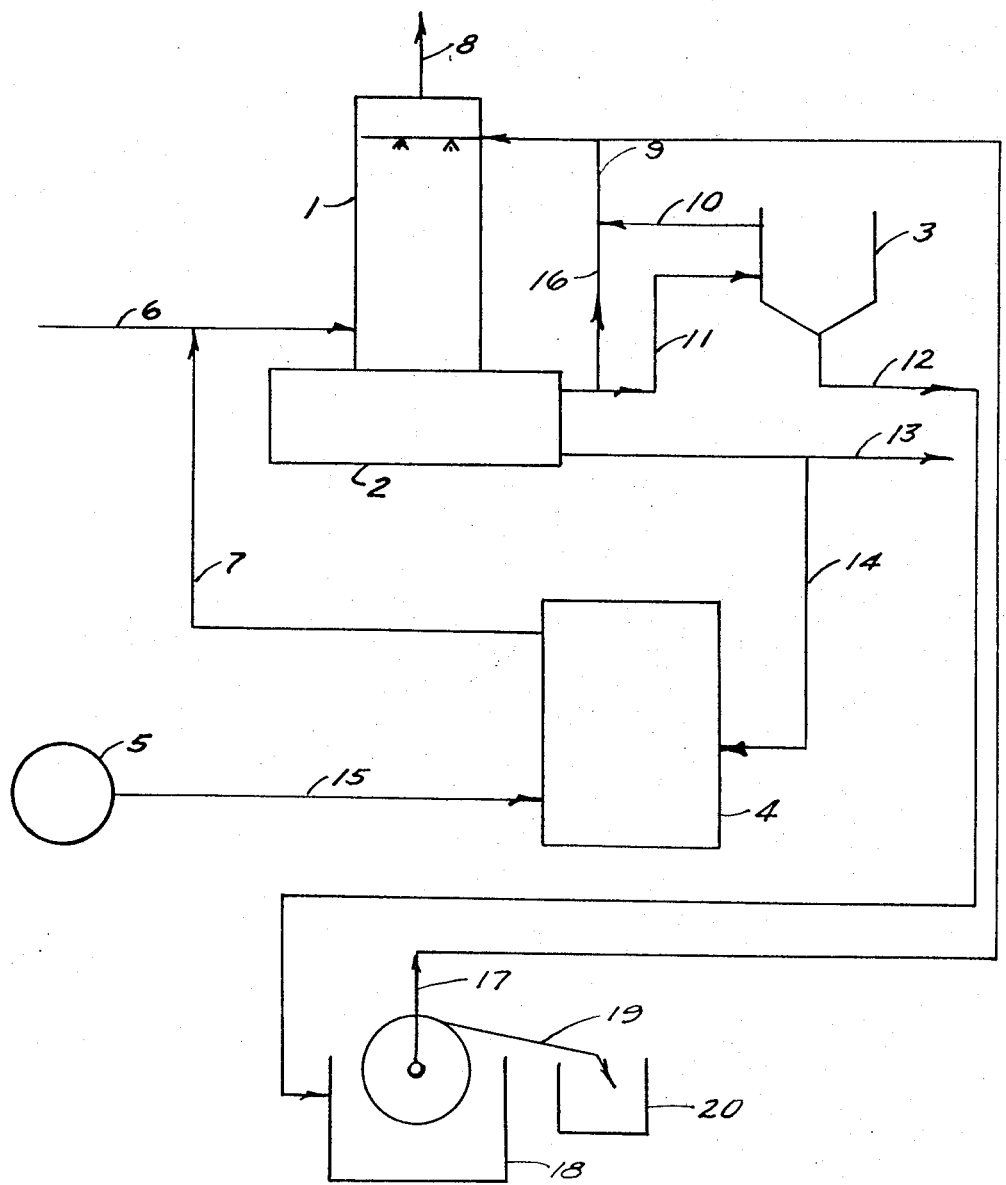

3,781,413
GAS PURIFICATION
Robert E. Opferkuch, Jr., Kettering, and Michael G. Konicek, Dayton, Ohio, assignors to Monsanto Research Corporation, St. Louis, Mo.
Filed Oct. 27, 1971, Ser. No. 192,847
Int. Cl. C01b 17/04
U.S. Cl. 423—574
6 Claims

ABSTRACT OF THE DISCLOSURE $SO_2$ and $H_2S$ are removed from a gas containing either one, or both with one in stoichiometric excess of the other, by the reaction of $SO_2$ and $H_2S$ in the presence of sulfuric acid.

For example, flue gas treatment in the presence of sulfuric acid solutions is possible at temperatures above 200° F., and preferably above the melting point of sulfur. By selecting the proper concentration of sulfuric acid solution, the water balance between the hot entering gas and the acid solution is maintained without the necessity to significantly cool the entering gas.

BACKGROUND OF THE INVENTION (1) Field of the invention.—The invention is in the field of chemistry, more specifically gas separation and purification, and especially in the field of $SO_2$ and/or $H_2S$ removal from gases such as natural gas, petroleum oil refinery gases, coke oven gas, flue gas and the like.

(2) Description of the prior art.—In "A Text-Book of Inorganic Chemistry," Vol. VII, Part II (1931), edited by J. Newton Friend, London, Griffin and Company, Ltd., page 115, the reaction $$2H_2S + SO_2 \rightleftharpoons 2H_2O + 3S$$

is described, and it is stated that it does not take place in the absence of a liquid, e.g. water, alcohol, etc., i.e. it does not take place in the vapor phase without a catalyst at high temperature (600° F+).

U.S. Pat. No. 2,881,047 teaches a method of simultaneously removing hydrogen sulfide from gaseous mixtures and producing sulfur therefrom. For example, sour natural gas, i.e. natural gas containing hydrogen sulfide, is treated with sulfur dioxide in an aqueous glycol medium.

U.S. Pat. No. 2,987,379 describes a process for the production of the sulfur wherein hydrogen sulfide or an alkyl mercaptan in a gas stream is treated with sulfur dioxide in an aqueous organic solvent containing an amine.

U.S. Pat. No. 3,023,088 teaches a process of producing sulfur wherein hydrogen sulfide in a gas stream is treated with sulfur dioxide in an aqueous carboxamide medium.

U.S. Pat. No. 3,050,370 describes a process for producing sulfur from hydrogen sulfide contained in a gas by treating the gas with sulfur dioxide in an aqueous ester medium.

SUMMARY OF THE INVENTION $SO_2$ and $H_2S$ are removed from a gas containing either one, or both with one in stoichiometric excess of the other, by the reaction of $SO_2$ and $H_2S$ in the presence of sulfuric acid. $SO_2$ and $H_2S$ react in aqueous media quickly and quantitatively in a 1:2 molar ratio, respectively, to produce sulfur and water. Until now, application of this reaction for gas purification, especially flue gases, has been limited by the necessity to cool the flue gas prior to the reaction in aqueous media and subsequently reheat the flue gas prior to its discharge to the atmosphere to provide buoyancy and plume control. Consequently, it is desirable to treat the flue gas at elevated temperatures to avoid substantial reheating of the gas after treatment. Sulfuric acid is an especially desirable medium in which to treat the flue gas for several reasons: (1) the vapor pressure of water over concentrated solutions of sulfuric acid is very low thus permitting operation at elevated temperatures without loss of water, (2) sulfuric acid solutions have very low pH which inhibits undesirable side reactions, (3) sulfuric acid solutions absorb $SO_3$, usually present to some extent in flue gases, without creating separation of disposal problems, (4) sulfuric acid is relatively cheap. For example, flue gas treatment in the presence of sulfuric acid solutions is possible at temperatures above 200° F., and preferably above the melting point of sulfur. By selecting the proper concentration of sulfuric acid solution, the water balance between the hot entering gas and the acid solution is maintained without the necessity to significantly cool the entering gas. Thus the operation is essentially isothermal, that is, the flue gas leaves the system at virtually the same temperature at which it entered and with essentially the same water vapor content.

An example of our isothermal process is one carried out at about 250° F. using about 80% sulfuric acid. In this process the water balance between the gas and acid is maintained and the treated gas at 250° F. it at a sufficiently high temperature for discharge to a stack and to the atmosphere. When sulfuric acid is used in our process it is preferred that the concentration of the acid be at least about 50 percent of weight $H_2SO_4$ in the acid, i.e., 50 percent by weight sulfuric acid, and more preferably at least about 70 percent by weight sulfuric acid.

BRIEF DESCRIPTION OF THE DRAWING

The drawing is a flow diagram from which is preferred embodiment of the invention is described.

DESCRIPTION OF THE PREFERRED EMBODIMENT

The invention is further illustrated by, but not limited to, the following example.

Fue gas at about 300° F., is mixed in line 6 of the figure with about twice an equal molar amount of hydrogen sulfide based on the sulfur dioxide in the flue gas, the $H_2S$ entering line 6 by line 7 and the mixed gases are introduced by line 6 into a fog or spray tower 1 wherein the gases are treated with an about 80% sulfuric acid spray at about 250° F. The treated gases leave the spray tower by line 8 at about 250° F. substantially free of $SO_2$ and $H_2S$. From the bottom of the spray tower sulfur formed in the process, fly ash sludge and sulfuric acid go to decanter 2, wherein molten sulfur is withdrawn as a bottom layer and the sulfuric acid and fly ash go by line 11 to acid clarifier 3 wherein a thickened fly ash-sulfuric acid slurry is withdrawn from the bottom by line 12 and the clarified sulfuric acid returned by lines 10 and 9 to the spray tower 1 for treating flue gas. The sulfuric acid is separated from the fly ash by filter 18 and the sulfuric acid filtrate is returned to the spray tower by lines 17 and 9. The fly ash cake 19 is collected in a suitable container 20 and is disposed of by proper solid waste treatment practices. If the acid from the decanter does not contain too much fly ash it can be recycled directly by line 16 and 9 to the spray tower for treating additional flue gas. Molten sulfur as a product can be withdrawn from the decanter by line 13; however, about two-thirds of the sulfur is sent by line 14 to a plant 4 for hydrogen sulfide generation and the hdyrogen sulfide goes from plant 4 by line 7 to treat flue gas. The hydrogen sulfide generating plant can be of a well-known commercial plant variety wherein methane from storage container 5 goes by line 15 to hydrogen sulfide generating plant 4 wherein it is reacted with sulfur and water to produce carbon dioxide and hydrogen sulfide. The reaction involves two moles of water plus one mole of methane and four atoms of sulfur reacting to give one mole of carbon dioxide and four moles of hydrogen sulfide.

Although the flue gas and the hydrogen sulfide can be separately added to the spray tower, it is preferred to mix the flue gas and hydrogen sulfide prior to addition to the spray tower in order to insure good distribution of reactants within the gas stream. Undesirable materials such as polysulfides and thiosulfates which are usually formed during the reaction of $H_2S$ and $SO_2$ in alkaline or slightly acid solutions are greatly inhibited in the concentrated sulfuric acid, thereby minimizing scrubbing liquor separation and regeneration problems.

Although the invention has been described in terms of a specified embodiment which is set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A process for removing $SO_2$ and/or $H_2S$ from a gas stream by reaction of $H_2S$ and $SO_2$ to form sulfur and water, said gas stream containing water vapor and either $SO_2$ or $H_2S$ alone or a mixture in which one is in excess of the stoichiometric requirements of said reaction, which comprises:
   (1) adding sufficient $H_2S$ or $SO_2$ to bring the mixture to about the stoichiometric amount for the reaction,
   (2) reacting said $SO_2$ and $H_2S$ at a temperature of at least about 200° F. in contact with sulfuric acid of such concentration that the water balance between said gas stream and acid is maintained, and
   (3) separating a gas stream substantially free of $SO_2$ and $H_2S$ containing essentially the same water vapor content as the feed gas stream.

2. A process of claim 1 wherein said gas is contacted at a temperature of about 250° F. with about 80% sulfuric acid.

3. A process of claim 2 wherein the $SO_2$ and $H_2S$ are mixed prior to contacting with the sulfuric acid.

4. A process of claim 2 wherein sulfur formed in the process is separated from the sulfuric acid.

5. A process of claim 2 wherein the $SO_2$ and $H_2S$ are mixed prior to contacting with the sulfuric acid, and sulfur formed in the process is separated from the sulfuric acid.

6. A process of claim 4 wherein the sulfur formed is molten and is separated by decantation.

References Cited

UNITED STATES PATENTS

| | | | |
|---|---|---|---|
| 2,563,437 | 8/1951 | Townend et al. | 423—575 |
| 2,534,063 | 12/1950 | Ross et al. | 423—574 |
| 1,962,051 | 6/1934 | Bordo | 423—575 |
| 2,839,365 | 6/1958 | Murray | 423—574 |

FOREIGN PATENTS

| | | |
|---|---|---|
| 14,364 | 1885 | Great Britain. |
| 8,164 | 1907 | Great Britain. |

GEORGE O. PETERS, Primary Examiner